Dec. 14, 1926.
J. GROH
1,610,856
PIPE CUTTING MACHINE
Filed May 19, 1924
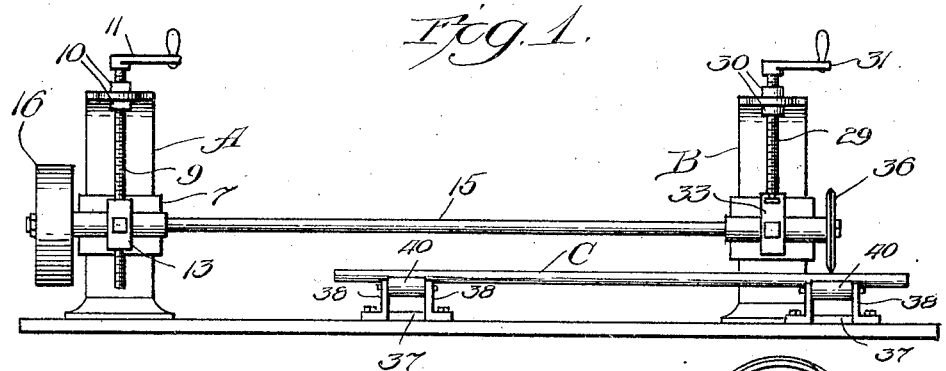
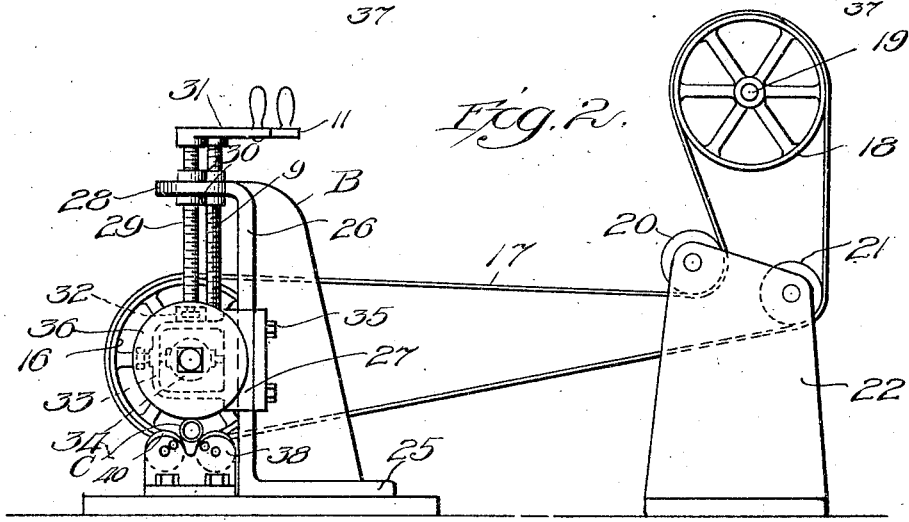
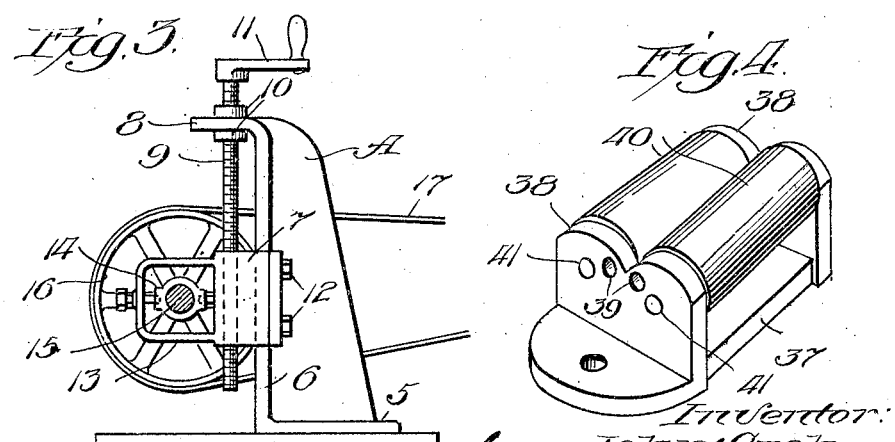
Inventor:
John Groh Patented Dec. 14, 1926.

1,610,856

UNITED STATES PATENT OFFICE.

JOHN GROH, OF CHICAGO, ILLINOIS.

PIPE-CUTTING MACHINE.

Application filed May 19, 1924. Serial No. 714,221.

This invention, which relates to a machine for cutting pipes of various sizes into desired lengths, is concerned particularly with certain improvements in the way of simplicity, durability, wide range of adjustability, etc., and, with the substitution of proper friction members, may be used for cleaning pipes as well. These and other objects are contemplated in this invention, the same being fully set forth in the specification and claims to follow.

An exemplification of my invention in its preferred form is illustrated in the accompanying drawing in the manner following:

Figure 1 is a front elevation of the machine in its entirety;

Fig. 2 is a view in elevation looking toward the cutting end thereof;

Fig. 3 is a similar view looking toward the opposite end; and

Fig. 4 which is a detail in perspective shows a suggestive construction of pillow block whereon the pipe may be rested.

In carrying out this invention, I employ a frame A of suitable construction, having a base 5 adapted to rest upon the floor or other support. As shown, this frame is provided with one or more vertically extending flanges 6 which co-operate with a bracket 7 that is slidably mounted thereon. At its upper end the frame is formed with a lateral extension 8 through which passes a screw shaft 9. This shaft effects a screw-threaded connection with the bracket 7, but with the frame extension 8 is held against endwise movement as by means of one or more collars 10 in engagement therewith. An operating handle 11 may be secured to the shaft, as shown, for the purpose of adjusting the bracket 7 to any desired vertical position. One or more bolts 12 having a screw threaded mounting in the bracket are adapted to engage with the frame flange 6, thereby securing the bracket in a fixed position of adjustment.

The bracket which is thus slidably mounted on the frame is itself provided with a laterally extending rectangular frame 13 wherein is trunnioned a bearing 14 for a driven shaft 15. One end of this shaft is shown as equipped with a pulley 16 over which is extended a belt 17 transmitting power from a second pulley 18 on a power shaft 19. On account of the vertical adjustability of the driven shaft 15, the power transmission belt may become either tight or loose, and to prevent this, the belt is required to pass over two idler pulleys 20 and 21 fixedly mounted on a suitable support 22. The two idlers are disposed to the rear side of the frame A and at such a height in relation to the driven shaft that the portions of the belt extending therefrom to the pulley 16 will diverge, one upwardly and one downwardly, in any ordinary adjused position of the bracket upon the frame. On account of this arrangement no appreciable tightening or slackening of the belt will occur with any change of adjustment in the height of the driven shaft 15.

Inasmuch at the present machine is designed to handle pipes of varying lengths, it is itself constructed of considerable length. In addition to the frame A, it embodies a second frame B of generally similar construction, as shown best in Fig. 2. This latter frame includes a base 25 adapted to rest upon the floor or other support, and upstanding therefrom a vertically extending flange 26. A bracket 27 is slidably mounted on this flange, the upper end of which terminates in an overhanging extension 28. Depending vertically from the extension is a screw shaft 29 which is prevented from endwise movement as by means of one or more collars 30 in engagement with the frame extension 28. An operating handle 31 may be conveniently secured to the screw shaft, as shown. At its lower end this shaft is rotatively connected as at 32 with a frame 33 which is laterally extended from the bracket 27. Trunnioned in this frame is a bearing 34 for the end of the shaft 15 which is remote from that which is journaled in the other bearing 14. As by means of one or more bolts 35 the bracket 27 may be secured in any desired position of vertical adjustment.

Carried on the shaft extremity adjacent the frame B is a rotary cutter 36 adapted to be revolved with motion of the shaft. Adjacent the cutter and directly therebelow is a pillow block which may have the construction shown in Fig. 4. As shown, it comprises a base 37 adapted to be secured upon the floor or support where the machine is located, and upstanding from the base are a pair of spaced walls 38 in each of which are provided a plurality of aligned openings 39, four being the preferred number for each wall. A pair of rollers 40 are positioned between the two walls 38 and are rotatably mounted upon suitable spindles 41, the ends of which are disposed within certain of the aligned openings 39. As shown in Fig. 4, these spindles are positioned in the outside holes permitting the use of rollers 40 of larger diameter than would be the case if the spindles were disposed within the inside openings. It is contemplated, therefore, that different sized rollers should be used,—a larger pair when the spindles are carried in the outermost holes, and a smaller pair when the spindles occupy the inside holes.

A pillow block answering to this description is adapted to receive thereon the pipe C which is to be cut. A second pillow block having, if desired, a construction which is similar to the one already described is preferably located between the two frames A and B so as to afford additional support to the pipe. With the pipe thus rested on two or more of such pillow blocks and free to rotate upon the rollers thereof, the rotary cutter 36 is adjusted to a position adjacent the pipe periphery. An adjustment of the bracket 7 on the other frame 8 is also made, the object being to have the shaft 15 in substantial parallelism with the pipe. The necessity for such adjustments lies in the fact that the present machine is capable of cutting pipes varying from perhaps one-half inch to eight inches in diameter, and when the cutting tool is preliminarily adjusted toward or from the pillow block, a corresponding adjustment should be made at the opposite end of the machine, so that the driven shaft will be parallel with the pipe.

As the cutting tool is revolved, the handle 31 may be revolved to apply additional pressure. The pipe which is also revolved under the action of the cutting tool quickly receives a peripheral cut and with the advancement of the tool for perhaps one-fourth of an inch is completely severed. The operation just described may be repeated as often as desired, a section of pipe being cut off each time.

The apparatus which I have disclosed herein is well adapted to be used for cleaning pipes, when equipped with suitable friction rollers for this purpose, such, for example, as are fully shown and described in Letters Patent No. 1,313,850 issued to me under date of August 19, 1919. As the adaptation of such rollers, in lieu of the rotary cutter, to the end of the shaft 15 should be perfectly obvious, I have not thought it necessary to burden the drawing with any illustration thereof.

The machine which has been described herein is essentially simple both in its construction and operation. The principles of this invention, however, are susceptible of embodiment in forms other than the particular one shown and described herein, and such modifications or changes which are based either in whole or in part upon the improved features peculiar to the invention are contemplated as within the scope of this patent, for which the following claims are made.

I claim:

1. In a machine for cutting pipes, the combination of a pair of spaced bearings, means wherein each bearing is mounted for independent adjustment in parallel directions, a shaft rotatably extended between the two bearings, means for applying power to the shaft, a roller support in proximity to the shaft, and a rotary cutter mounted on the shaft adjacent the roller support and movable toward and from the same whereby to sever a pipe which is rested thereon, substantially as described.

2. In a machine for cutting pipes, the combination of a rotatable shaft, a cutter mounted on the shaft, a pair of spaced bearings wherein the shaft is mounted, independently adjustable means whereon each bearing is swingingly and slidably supported, and a support whereon a pipe may be rotatably received arranged adjacent the cutter, the cutter being adapted for movement toward the support to engage with the pipe thereon, substantially as described.

3. In a machine for cutting pipes, the combination of a shaft whereon is carried a rotary cutter, a pair of spaced bearings wherein the shaft is mounted, a pair of adjustable frames, one for each bearing, each bearing being swingingly associated with its frame, a driven pulley on the shaft, a driving pulley removed therefrom, a belt connection between the two pulleys, means fixedly mounted and engaging with the belt in a manner to preserve a constant tension thereon irrespective of the adjusted positions of the driven shaft, and means whereon the pipe may be rotatably supported adjacent the cutter, substantially as described.

JOHN GROH.